No. 712,498. Patented Nov. 4, 1902.
E. P. COLEMAN.
GOVERNOR.
(Application filed July 5, 1901.)
(No Model.) 2 Sheets—Sheet 1.
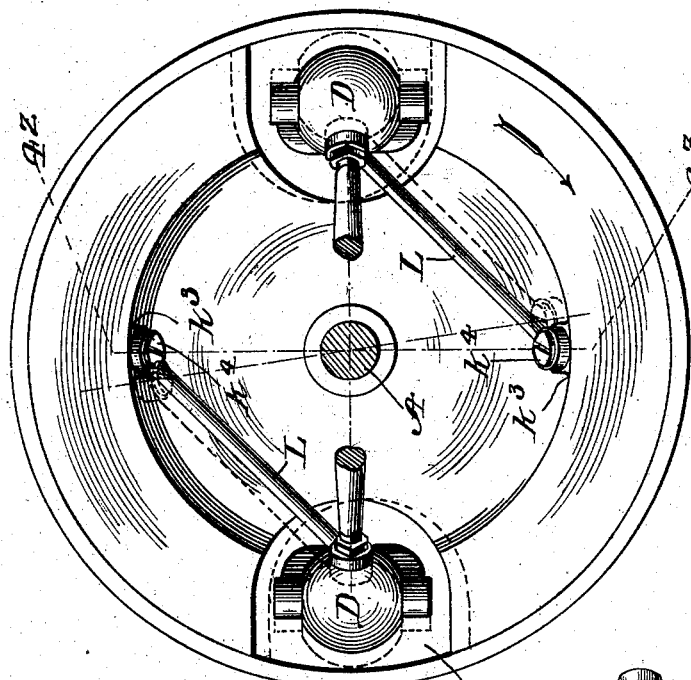
Fig. 3
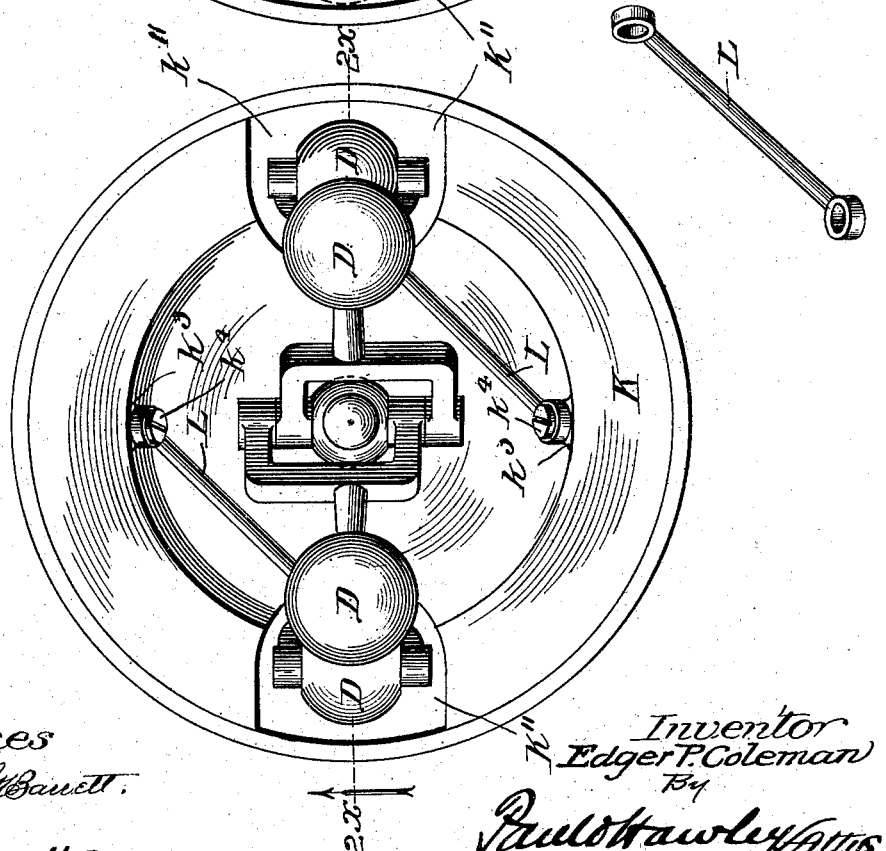
Fig. 1
Fig. 6
Witnesses
Harold H. Barrett
Edw. Barrett
Inventor
Edger P. Coleman
By
Paul O. Hawley Attys
THE NORRIS PETERS CO., PHOTO-LITHO., WASHINGTON, D. C.

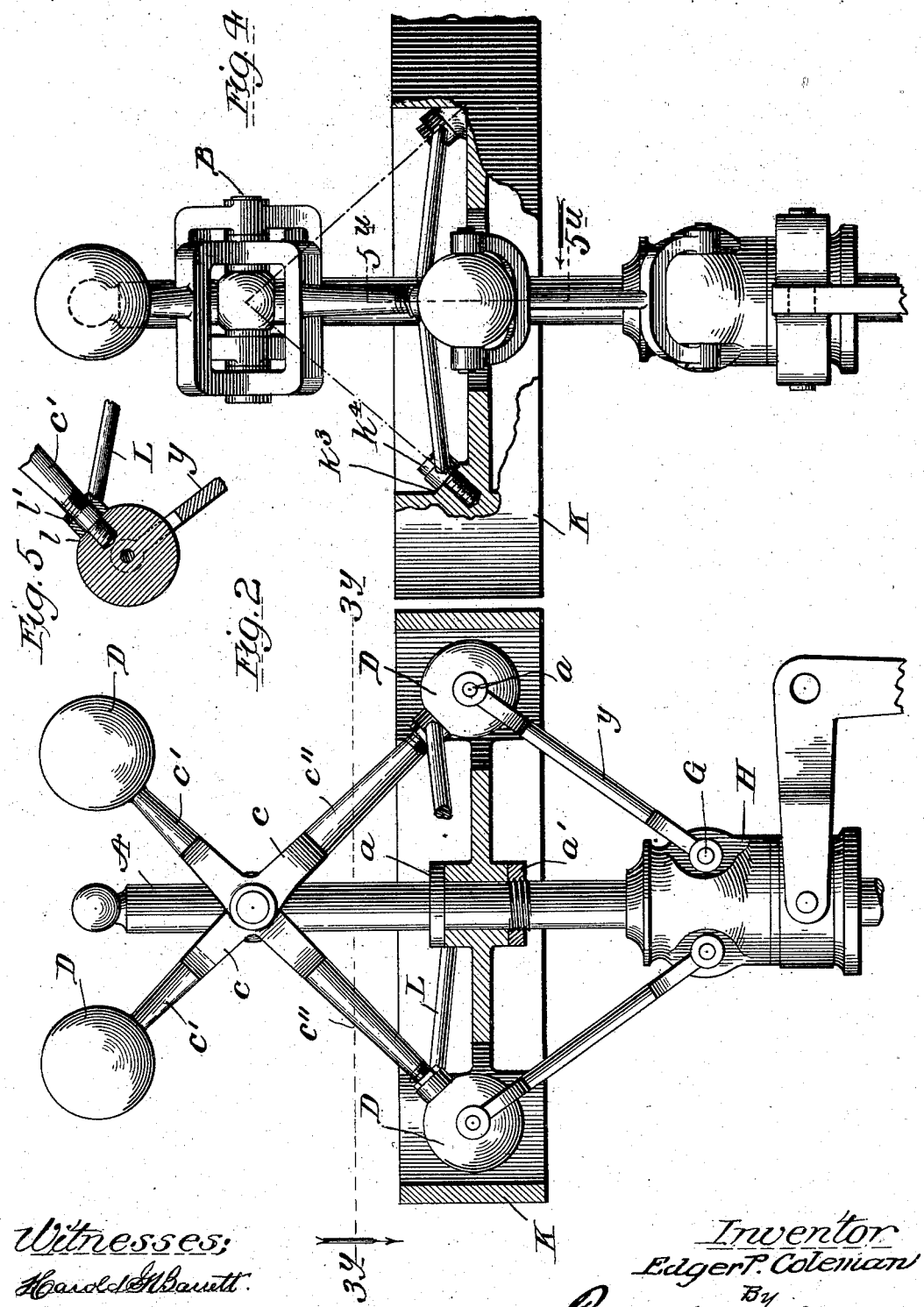

UNITED STATES PATENT OFFICE.

EDGAR P. COLEMAN, OF CHICAGO, ILLINOIS.

GOVERNOR.

SPECIFICATION forming part of Letters Patent No. 712,498, dated November 4, 1902.

Application filed July 5, 1901. Serial No. 67,099. (No model.)

*To all whom it may concern:*

Be it known that I, EDGAR P. COLEMAN, of the city of Chicago, county of Cook, and State of Illinois, have invented certain new and useful Improvements in Governors, of which the following is a specification.

My invention relates to improvements in governors, and has particular reference to the pseudo-astatic class of fly-ball governors. The pseudo-astatic fly-ball governors as heretofore constructed have depended for their astatic operation upon having the centrifugal moments increase or decrease in a ratio approximating the ratio of change in the gravity moments, the latter remaining substantially the same as in the common form of static fly-ball governors. On account of this relation of varying moments the construction of the governors has been objectionable, either on account of its abnormal total length and crossing of arms, which necessitates many moving parts, or on account of the still more complex structure of the governor when an arrangement is adapted whereby the length is not increased. Moreover, the tendency to race or hunt in the pseudo-astatic governors now in use increases rapidly the nearer astatic they are made, and for practical purposes they are accordingly purposely so designed that they shall not be approximately astatic. For this reason they have a smaller change in height for a corresponding change in speed than is desirable. Moreover, it becomes necessary to make the parts of relatively great weight in order to overcome the hurtful effects of internal friction.

The object of my invention is to improve the construction of governors, to the end that the same may act quickly and powerfully upon any change of speed to control the prime mover.

A further object of my invention is to reduce the number of moving parts of a governor and the friction of the same.

My invention consists in the combination, in a governor, of a differential fly-ball arrangement comprising spindle, two crank-levers, each having fly-balls mounted upon its arms and pivoted to swing upon opposite sides of said spindle, so that the gravity moments of both balls of each lever act together, while the centrifugal moments of the same act in opposition to each other, and means for connecting the said levers and the engine-valve gear.

My invention also consists in the arrangement of parts in a governor having the fly-balls pivoted on horizontal axes, so that the force of inertia may be employed to assist centrifugal force in moving the levers, whereby the governor is rendered powerful.

My invention further consists in the combination, in a governor, of the differential fly-balls and the arrangement of parts whereby the inertia of the same may be employed to assist the centrifugal forces, thereby producing a governor which is highly astatic and at the same time highly powerful.

My invention will be more readily understood by reference to the accompanying drawings, forming part of this specification, and in which—

Figure 1 is a plan view of my governor. Fig. 2 is a side elevation, the fly-wheel being shown in section, taken on line $2^x 2^x$ of Fig. 1. Fig. 3 is a horizontal section on line $3^y 3^y$ of Fig. 2. Fig. 4 is a side elevation at right angles to that shown in Fig. 2, a portion of the fly-wheel being shown in section. Fig. 5 is a vertical section of a lower fly-ball and connections, taken on line $5^u 5^u$, Fig. 4. Fig. 6 shows an inertia-weight and fly-ball connecting link.

In the form of my device shown in the drawings, A is the vertical spindle to be connected to and driven from the engine in the usual manner.

B is a short horizontal shaft secured in the upper portion of spindle A.

C C are two bell-crank levers journaled upon shaft B and arranged to operate upon opposite sides of said spindle A. The said bell-crank levers are bifurcated at their elbows, whereby they are each adapted to engage shaft B on both sides of spindle A. The upper arms $c'$ of the bell-crank levers C are made shorter than the lower arms $c''$, and to the free ends of each of the arms $c'$ and $c''$ is attached a fly-ball D. The lower fly-balls are provided with shafts or spindles E, and to these shafts or spindles E are pivoted yoke-ended links F, which connect to pivot G on the slider H.

Upon spindle A, at a point intermediate of the shaft B and slider H, is journaled an inertia-weight or fly-wheel K, held in position on spindle A by two collars $a$ $a'$, one of which is preferably fast upon said spindle and the other screw-threaded thereto. The inertia-weight or fly-wheel K is provided with apertures $k''$ $k''$ near the outer face and on opposite sides of the spindle A for the passage therethrough and free play therein of the lower fly-balls and connected parts. On the upper side of the inertia-weight or fly-wheel upon a diameter substantially at right angles to the diameter passing through the apertures $k''$ are two seats $k^3$, provided with tapped holes for the reception of bearing pins or screws $k^4$. Links L connect at one end with a bearing pin or screw $k^4$ and at the other end with a lower fly-ball arm $c''$, as shown in Fig. 5, and held in place by a shoulder $l$, turned on the ball D, and a screw-threaded nut $l'$ on the arm. It is obvious that links L might have ball-and-socket or other pivotal connections at their ends, whereby they would be adapted to move freely in the various positions of the arms; but I prefer the form of connections shown. By so locating the axes of the bearing pins or screws $k^4$ and arms $c''$ that they intersect the axis of the spindle A at the same point two triangles are formed, as indicated by dotted lines, Figs. 3 and 4, each having a link L and its pivoted axes for the sides, which are of fixed length, for the link engages the fly-ball arm at a point which remains a fixed distance from the common meeting-point of the axes, the length of the link is fixed, and the remaining side of each triangle is also fixed in length, for the point at which the link is pivoted to the inertia-weight or fly-wheel being carried by the said inertia-weight or fly-wheel is caused to travel in the circumference of a circle which is held at a fixed distance from the common meeting-point of the axes. It is evident from this construction that whichever pivoted axis of the link is held fixed the other end of the link will travel in a true circle about it, and as a consequence cylindrical pivoted bearings between the links and the fly-ball arms and the bearing pins or screws on the inertia-weight or fly-wheel may be employed and without liability of any cramping action.

The operation of my device is substantially as follows: Assuming the governor, as shown in Fig. 3, to be rotating in the direction of the arrow beneath said figure and that the spindle is given an increment of speed, the inertia-weight or fly-wheel K, being loosely journaled upon the spindle, tends to lag behind, as indicated in dotted lines, Fig. 3, and by means of its toggle connection with the lower fly-ball arms through links L its inertia is communicated to said ball-arms, assisting centrifugal force in forcing them outward, and thereby positively overcoming the starting friction of the moving parts. If, on the other hand, we assume that there is a decrement of speed taken from the spindle, then the inertia-weight or fly-wheel tends to run ahead of the spindle and by means of its toggle connection with the fly-ball arms will coöperate with the decrease in centrifugal force to draw said arms in toward the axis of rotation. The inertia-weight or fly-wheel having given up its inertia in moving the several parts rotates in unison with the spindle. The fly-balls by reason of the differential arrangement have a relatively large change of height to the change in speed, and as a consequence a slight change in speed is quickly responded to by the governor. It will be observed that this relatively large change in height is due to my differential arrangement of fly-balls, for by pivoting the bell-crank levers so that the gravity moments of both balls of each lever act together and not in opposition while the centrifugal moments of the balls on each arm act in opposition the sum of the gravity moments on each lever remains nearer a fixed quantity than in other governors, for it will be noted that while the arm through which gravity acts upon the lower ball increases as the sine of the angle between the spindle and fly-ball arm the arm through which gravity acts on the upper ball decreases as the cosine of the angle. Moreover, it is apparent that while the sum of the gravity moments varies for the different angles it reaches its maximum near the angle at which the centrifugal moments attain their maximum, whereas in the common form of governor the maximum arm through which gravity acts is at the angle where the centrifugal arm is at a minimum. The result of having nearer uniform gravity moments for the various positions of the fly-balls and having their maximum at or near the same angle at which the centrifugal moments attain their maximum, being that for the normal speed, the gravity moments vary substantially in proportion to the variation in the centrifugal moments, and when the speed departs from the normal a larger change in height at once results than is practical in the so-called "pseudo-astatic" governors heretofore in use. In my governor the high power of the same is obtained by providing an inertia mass, which is mounted to move relatively to the spindle, and it is evident that so far as the action of the inertia forces is concerned it might be located in the fly-ball arms, provided the latter are made capable of a rotation relative to the spindle. It is therefore apparent that I may replace the inertia-weight or fly-wheel shown in the drawings with suitable means for supporting the bearing pins or screws $k^4$ in fixed position upon the spindle, transfer the mass of inertia-weight or fly-wheel to the fly-balls, and connect the fly-ball levers so that they may revolve relatively to the spindle. By the employment of inertia-weight or fly-wheel, as shown, my governor is rendered highly powerful and without accomplishing the result at the expense of correspondingly increased friction, for by journaling the inertia-weight upon the spindle and connecting it with the fly-ball arms by links L, as indicated in the drawings, the extra weight introduced into the governor as a whole is supported by the spindle and not by the movable parts connected to the valve, and as a consequence thereof the friction of the movable parts is not increased by the introduction of this additional weight. Moreover, by the employment of the inertia-weight or fly-wheel shown I am enabled to make the movable parts of my governor of relatively light weight, and by locating the pivotal journals at substantially right angles to the directions of the forces acting to move the respective parts the friction of said movable parts is reduced to a minimum. As a consequence of this reduction of friction a still less variation in the speed of the governor is necessary to cause a change in position of the movable parts.

While I have confined my description to the construction shown in the drawings, it is evident that many changes and modifications of the same may be made without departing from the spirit and scope of my invention.

What I claim as new, and desire to secure by Letters Patent, is—

1. In a governor having a spindle and slider, the combination of pivotal arms carried by said spindle, an inertia-weight longitudinally fixed upon said spindle and so mounted as to normally rotate in unison with said spindle and capable of a relative movement therewith upon a change in speed of the spindle, means whereby the relative movement of the inertia-weight causes a radial movement of the arms and means connecting said arms with said slider.

2. In a centrifugal governor having a spindle, a slider and connecting arms or links, the combination of an inertia-weight longitudinally fixed upon said spindle and adapted to revolve relatively to the spindle and means for communicating its inertia to the connecting arms or links.

3. In a governor having a spindle, a slider and connecting-links, the combination of an inertia-weight mounted to revolve relative to the spindle, in a fixed plane at right angles thereto and means for communicating the inertia of said weight to the connecting-links, whereby said links are moved out of their given position when there is a change in the relative rate of speed of spindle and weight.

4. The combination of a slider, a spindle, arms pivoted thereon and adapted to rotate in unison with said spindle, an inertia-weight mounted upon and adapted to rotate relative to said spindle, connecting-links having cylindrical journal connections between said inertia-weight and said arms and means connecting said arms with said slider.

5. In a governor having a spindle and slider, fly-balls and pivoted arms connected thereto, the combination of an inertia-weight or fly-wheel, fixedly journaled with relation to the said spindle and means for communicating the inertia of said weight or fly-wheel to the fly-ball arms.

6. In a governor having a vertical spindle, a slider and fly-ball arms thereon, the combination of an inertia-weight or fly-wheel mounted on said spindle to rotate in a fixed plane and means for communicating the inertia of said weight or fly-wheel to the fly-ball arms.

7. In a governor having a vertical spindle, a slider and fly-ball arms connected to said spindle and slider, the combination of an inertia-weight or fly-wheel loosely mounted with relation to said spindle and revoluble in a fixed plane, and links connecting said inertia-weight or fly-wheel and the said fly-ball arms.

8. In a governor having a spindle and slider, the combination of differential fly-balls and levers, means connecting said fly-balls with said slider, an inertia-weight or fly-wheel loosely mounted but fixed as to its plane of rotation and adapted to rotate with said spindle and means for transmitting the inertia of said weight or fly-wheel to said levers.

9. In a governor having a spindle and slider, the combination of the pairs of differential fly-balls and levers upon opposite sides of said spindle, means connecting said fly-balls with said slider, an inertia-weight or fly-wheel loosely mounted upon said spindle and adapted to rotate therewith, and means for transmitting the inertia of said weight or fly-wheel to said levers.

10. In a governor having a spindle and slider, the combination of differential fly-balls and levers, means connecting said fly-balls with said slider, an inertia-weight or fly-wheel loosely mounted upon said spindle and adapted to rotate therewith, and links connecting said inertia-weight or fly-wheel with said levers.

11. In a governor having a slider and spindle, the combination of differential fly-balls and levers pivoted to said spindle and connected with said slider, an inertia-weight or fly-wheel loosely mounted upon said spindle and adapted to rotate therewith, links connecting said weight or fly-wheel with said levers whereby motion of the weight or fly-wheel about the spindle will be transmitted to said levers.

12. In a governor the combination of a spindle having a transverse shaft secured thereto, two bell-crank levers pivoted to said shaft, fly-balls carried by said levers, an inertia-weight loosely mounted upon said spindle, links having cylindrical bearings connecting the ends thereof with the said inertia-weight, and bell-crank levers and means whereby movement of said levers is communicated to the valve-gear.

13. In a governor, the combination of a spindle, ball-arms, weights and sliders, the links operatively connecting said spindle and ball-arms and relatively movable to the operation of inertia to retract said arms upon a decrement of speed of said spindle, and to project said arms upon an increment thereof.

14. In a fly-ball governor, the combination with the spindle and slider of the ball-arms pivoted to said spindle and linked to said slider, the inertia-weight fixed as to its plane of rotation and adapted for rotation with relation to said spindle and links connecting said inertia-weight with said fly-ball arms, the pivotal axes of said arms and the last-mentioned links, when projected, intersecting at a single point in said spindle, substantially as described.

In testimony whereof I have hereunto set my hand, in the presence of two witnesses, this 1st day of July, 1901.

EDGAR P. COLEMAN.

Witnesses:
C. G. HAWLEY,
JOHN F. BARTLETT.